No. 654,125. Patented July 24, 1900.
W. L. BEALL.
PIVOT AXLE CULTIVATOR.
(Application filed Jan. 4, 1900.)

(No Model.) 6 Sheets—Sheet 3.

No. 654,125. Patented July 24, 1900.
W. L. BEALL.
PIVOT AXLE CULTIVATOR.
(Application filed Jan. 4, 1900.)
(No Model.) 6 Sheets—Sheet 4.

Witnesses
L. C. Hills
J. D. Kingsbury

Inventor
William L. Beall
By Whitaker Prevost
Attorneys

UNITED STATES PATENT OFFICE.

WILLIAM L. BEALL, OF ALBION, MICHIGAN, ASSIGNOR TO THE GALE MANUFACTURING COMPANY, OF SAME PLACE.

PIVOT-AXLE CULTIVATOR.

SPECIFICATION forming part of Letters Patent No. 654,125, dated July 24, 1900.

Application filed January 4, 1900. Serial No. 378. (No model.)

*To all whom it may concern:*

Be it known that I, WILLIAM L. BEALL, a citizen of the United States, residing at Albion, in the county of Calhoun and State of Michigan, have invented certain new and useful Improvements in Pivot-Axle Cultivators; and I do hereby declare the following to be a full, clear, and exact description of the invention, such as will enable others skilled in the art to which it appertains to make and use the same.

My invention is an improvement in pivot-axle cultivators; and it consists in the novel features hereinafter described, reference being had to the accompanying drawings, which illustrate one form in which I have contemplated embodying my invention, and said invention is fully disclosed in the following description and claims.

Referring to the drawings, Fig. 3 is a transverse sectional view taken on line 3 3 of Fig. 2 looking in the direction of the arrows. Fig. 4 is an enlarged perspective view of the tongue-adjusting devices. Fig. 8 is an enlarged sectional view of a portion of the main frame and one of the pivoted axles. Fig. 9 is a perspective view of a portion of the main frame and the casting for supporting one of the pivoted axles.

My invention is designed to provide a cultivator having all the advantageous features of a pivot-axle cultivator of improved design and construction and in which the axles can be locked when desired and the cultivators controlled directly by means of stirrups secured thereto and adapted to be engaged by the feet of the operator.

The main frame of the machine is composed of a series of bars bolted or otherwise secured together.

$a\ a$ represent the transverse horizontal bars of the arch, which are provided at each end with a casting $b$, to which are secured the downwardly-extending pivots or standards, upon which the independent axles are pivotally mounted.

$a'\ a'$ represent forwardly-extending bars of the main frame, bolted at their rear ends to the forward bar $a$, extending forward substantially perpendicular to the said bar $a$ for a considerable distance and then bend inward and are secured pivotally to the tongue A at A'.

$a^2$ represents a continuous bar having its ends bolted to the arch-bar $a$, its main portions parallel with the bars $a'\ a'$ and provided with a central portion $a^3$, which extends transversely of the machine immediately in rear of the tongue A. The parallel portions of the bars $a'$ and $a^2$ are spaced by the blocks $a^4$ and are united by bolts passing through said blocks.

$a^5\ a^5$ represent inclined brace-bars, each of which is connected at its rear end to the bars $a\ a$ and at the forward ends to the bars $a^2\ a^2$ to stiffen the frame.

Each of the end castings $b\ b$ is provided on its under side with a vertical recess or socket, in which is placed a vertical pivot-standard B, held in place by means of a set-screw $b'$. Upon the pivot-standard B is pivotally mounted the casting B', which is provided with a sleeve or socket $b^2$ to fit over the lower end of the pivot-standard B, a horizontal sleeve $b^3$ to receive the axle $B^2$, and an inwardly-extending sleeve or socket $b^4$, which receives the inner end of the steering-lever $B^3$. The pivot-standard B is secured in the socket $b^2$ by means of a pin $b^5$, which is secured to the standard and projects therefrom through a horizontal slot $b^6$ in the wall of the socket $b^2$ to permit the desired swing of the axle. The axle $B^2$ is secured in its sleeve $b^3$ by a set-screw $b^7$, which preferably extends up through the bottom of the sleeve. The steering-lever is secured in its socket $b^4$ by a set-screw $b^8$. Upon each of the axles $B^2$ is mounted one of the two supporting-wheels C C, and upon each of the inwardly-extending steering-levers B³ B³ is secured an adjustable footpiece B⁴, provided with a collar $b^9$, which slips over the end of lever B³ and is secured by means of a set-screw $b^{10}$. It will thus be seen that by loosening the set-screw $b^{10}$ the footpiece can be adjusted toward or from the pivot-standard and also around the lever B³, which is a round bar, or by loosening set-screw $b^8$ the lever and footpiece may be removed altogether. The pivotal casting B' is also provided with a forwardly-extending perforated bracket $b^{11}$, to which is rigidly secured a forwardly-extending arm $d$, to the forward end of which is pivoted the transverse connecting-bar D, by means of which the simultaneous movement of the two pivot-axles is produced.

Figure 2:
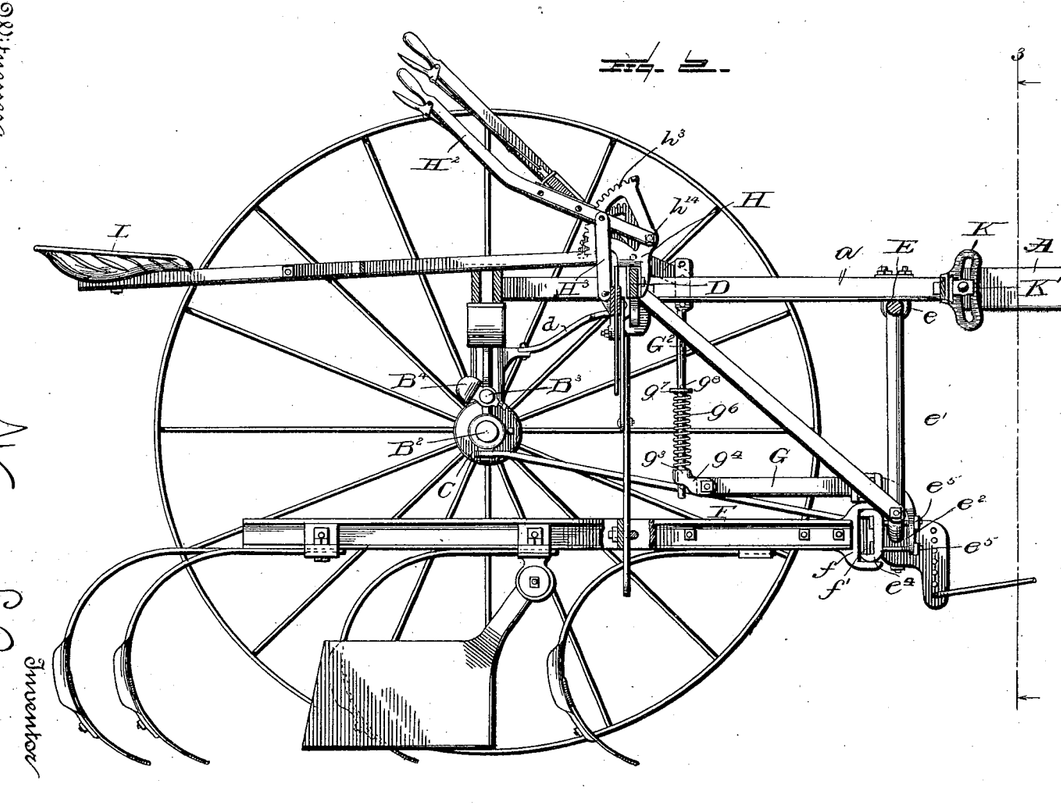
Fig. 2 represents a longitudinal vertical sectional view of the same.
Figures 10, 11, 12:
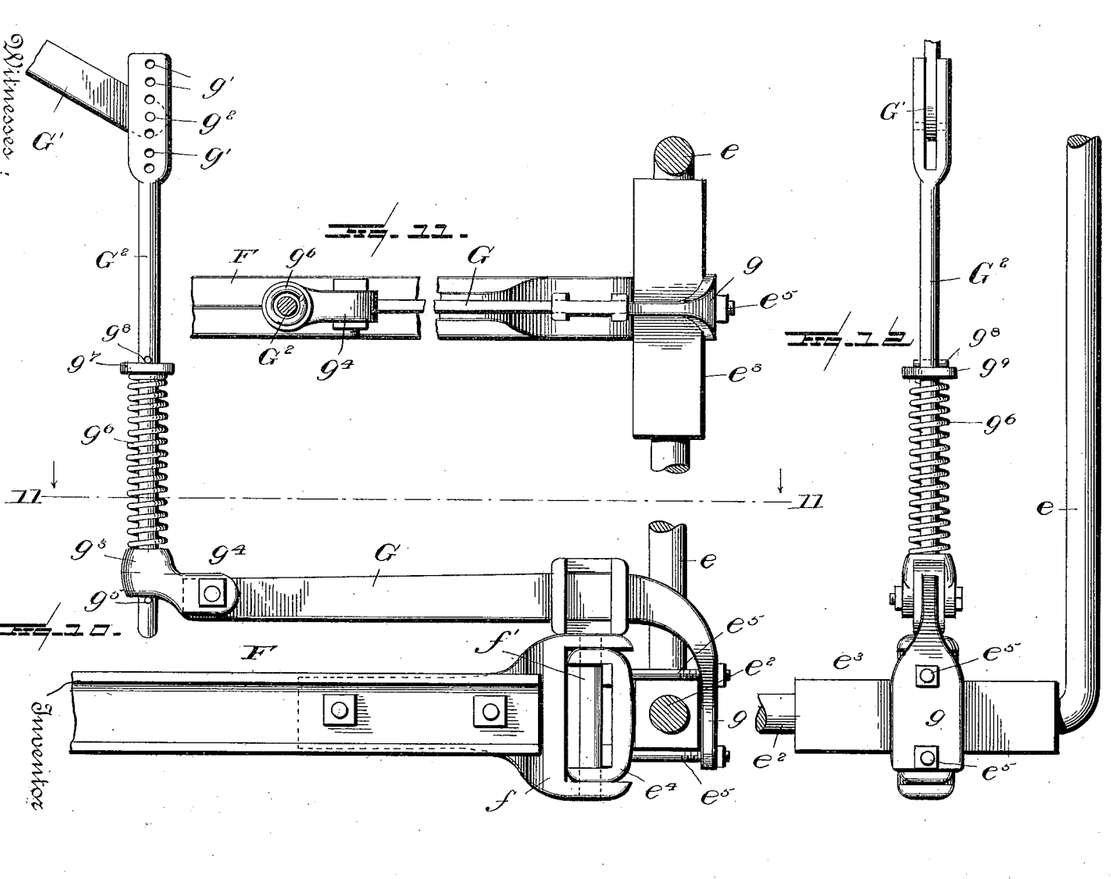
Fig. 10 is an enlarged view of one of the elevating and depressing levers and adjacent parts.
Fig. 11 represents a horizontal section on line 11 11 of Fig. 10.
Fig. 12 is a front view of the devices shown in Fig. 10.

Near its forward end the main frame is provided with a depending portion, to which the front ends of the two cultivator-sections are pivoted. This depending portion consists, mainly, of the arched bar having a horizontal part E secured to the under side of the bars $a'$ $a'$ of the main frame by means of suitable clips $e$ and having downwardly-extending arms $e'$, provided at their lower ends with outwardly-projecting horizontal pivots $e^2$. Upon each of the pivots $e^2$ is mounted a sleeve $e^3$, preferably square in cross-section, as shown in Fig. 10, and to this sleeve is bolted a hinge member $e^4$. The forward ends of each of the cultivator-sections F is provided with a hinge member $f$, which is pivotally connected to the hinge member $e^4$ of one of said sleeves $e^3$ by a vertical pivot-pin $f'$. This construction allows each cultivator-section to be swung laterally on the pivot-pin $f'$ and to be moved up and down upon the pivot $e^2$, as will be readily understood from the drawings. The head of the pivot-pin $f'$ is preferably provided with one or more slots or recesses, through which passes an elevating and depressing arm G, the forward end of which is bent downwardly and provided with a widened portion $g$, through which are passed the bolts $e^5$, which secure the hinge member $e^4$ to the sleeve $e^3$. By reference to Figs. 2 and 10 it will be seen that by means of this lever G the cultivator-sections can be raised or lowered upon the pivotal connection with the pivot $e^2$. The main frame is provided on each side with an operating hand-lever G', pivoted to the frame and provided with the usual ratchet and segment for adjusting it. To the lower end of each lever G' is pivoted an elevating and depressing rod G², which has its upper end flattened to engage the lever G' and provided with a series of apertures $g'$ $g'$ to receive the pivot $g^2$, by means of which it is connected to the lever G'. By this means the connection between the lever G' and the rod G² may be adjusted. The main portion of the rod G² is ordinarily round, and its lower end passes through a sleeve $g^3$ on a casting $g^4$, which is preferably formed separately from and bolted to the elevating and depressing lever G, although it is obvious that it might be formed integral therewith, if preferred. Below the sleeve $g^3$ the rod G² is provided with a pin $g^5$, by means of which the lever G may be elevated, and the rod G² is also provided with a coiled spring $g^6$, surrounding the same above the sleeve $g^3$, having one end engaging said sleeve and its other end engaging a collar $g^7$, which is retained in position by a pin $g^8$, passing through the rod G². From this construction it will be seen that an upward movement of the rod G² will positively raise the lever G and the cultivator-section, while a downward movement of the rod G² will lower the section into the ground and hold it down with a yielding pressure, owing to the spring $g^6$, which is interposed between the rod G² and the elevating and depressing lever G. By means of the hand-levers G' G' the operator can elevate either section out of the ground or lower it into operative position and hold it so that it will cultivate at the desired depth.

In order to hold the two cultivator-sections at any desired distance apart when the machine is used as a pivot-axle cultivator, I provide the following-described mechanism, which mechanism may, however, be thrown out of operation and, if desired, removed from the machine when the machine is used as an ordinary cultivator and the sections steered by the feet of the operator.

$h$ $h$ represent two vertical bars having their upper ends pivoted to the transverse connecting-bar D at opposite sides of the center and their lower ends passing through eyes or loops secured to the cultivator-sections, so that by giving these rods a simultaneous inward or outward movement the cultivator-sections will be drawn closer together or separated.

Figure 5:
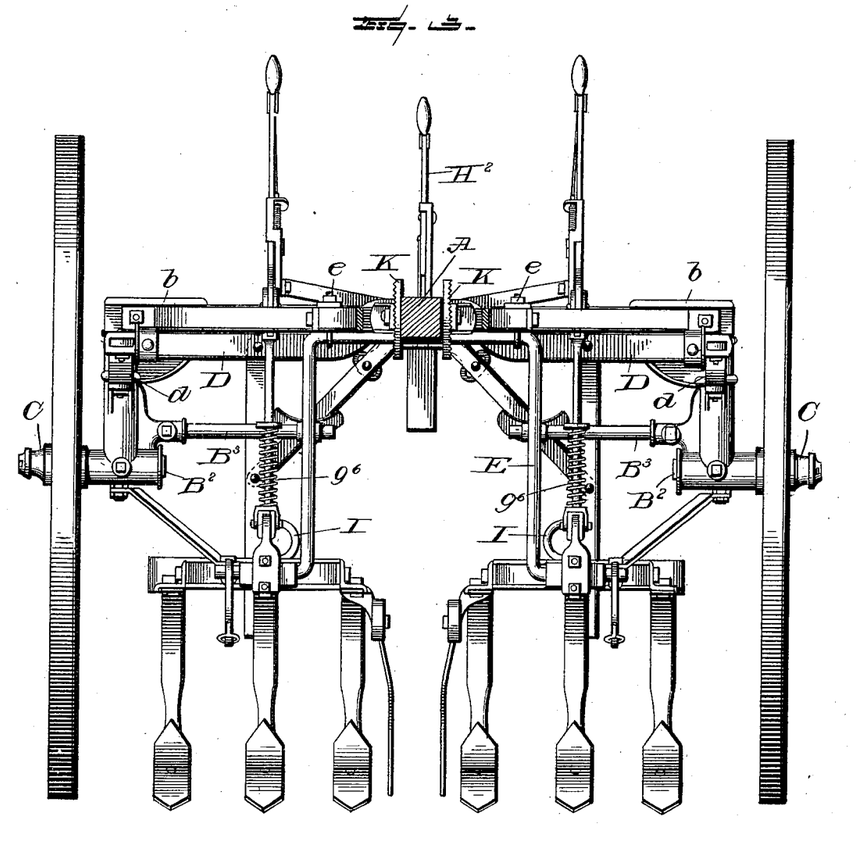
Fig. 5 is a partial front view of the connecting-bar for the front axles and connected parts drawn to an enlarged scale.
Figures 5, 6:
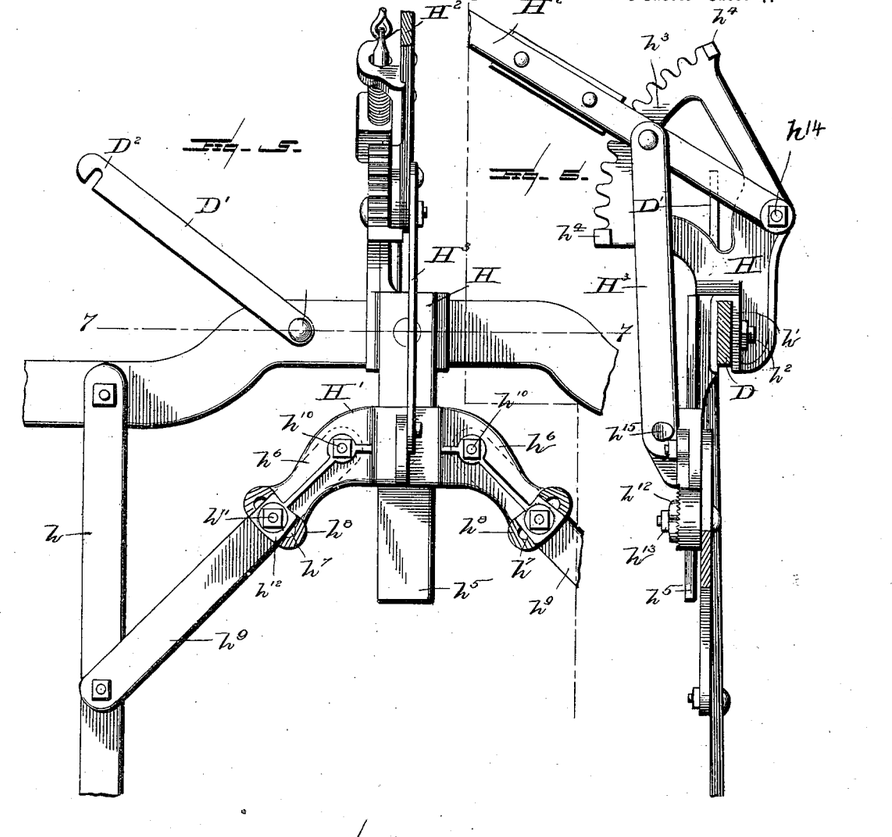
Fig. 6 represents a vertical section on line 6 6 of Fig. 5.
Figure 6:
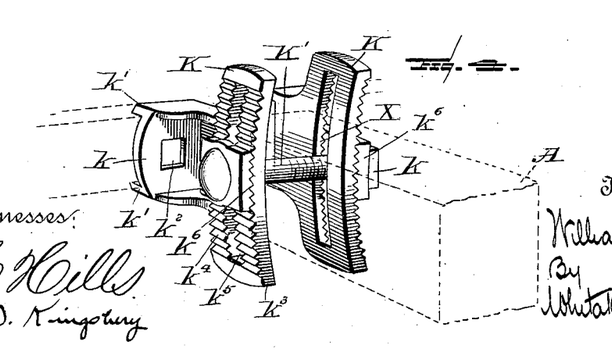
Figure 7:
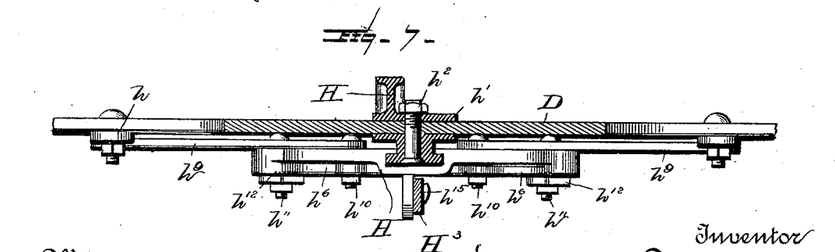
Fig. 7 represents a section on line 7 7 of Fig. 5.

H represents a removable casting which is provided on its under side with a recess $h'$, adapted to fit over the transverse connecting-bar D, as clearly shown in Fig. 6, and to be secured thereto by a bolt $h^2$. This casting H is also provided with a segment $h^3$, having a stop $h^4$ at its upper end and at its lower end and provided with teeth to engage the usual lever-pawl, and said casting is also provided with a downwardly-extending guide $h^5$, of a right-angular retaining construction analogous to a dovetail.

H' represents a vertically-movable slide having a recess to engage the guide $h^5$, and said slide is also provided with laterally-extending arms $h^6$, having at their outer ends curved slots $h^7$ and preferably having on one side a series of serrations or ribs $h^8$, adjacent to the slotted portions.

$h^9$ $h^9$ represent adjustable links, each of which is connected at one end pivotally to one of the downwardly-extending bars $h$ intermediate its ends and has its other end connected by a pivot-bolt $h^{10}$ to the slide H'. Each of the links $h^9$ is provided with an adjusting-bolt $h^{11}$, extending through the same and through the slotted portion $h^7$ of one of the arms $h^6$ of the slide H', and said bolt is provided with a block $h^{12}$, having its inner face ribbed or serrated to engage the face $h^8$ of said arm, the said bolt being also provided with the usual nut $h^{13}$. It will be seen that when the nuts $h^{13}$ are loosened if the slide H' is moved up and down it will cause the bars $h$ to move toward or away from each other, and thereby adjust the positions of the cultivator-sections. It will also be seen that under these conditions the links $h^9$ can be moved to different angles with respect to the slide H', so as to give the proper or desired movements to the cultivator-sections. It will be further seen that the slide can be moved to bring the cultivator-sections nearer together or place them farther apart and the nuts $h^{13}$ then tightened to maintain them in that relation, if desired.

Figure 1:
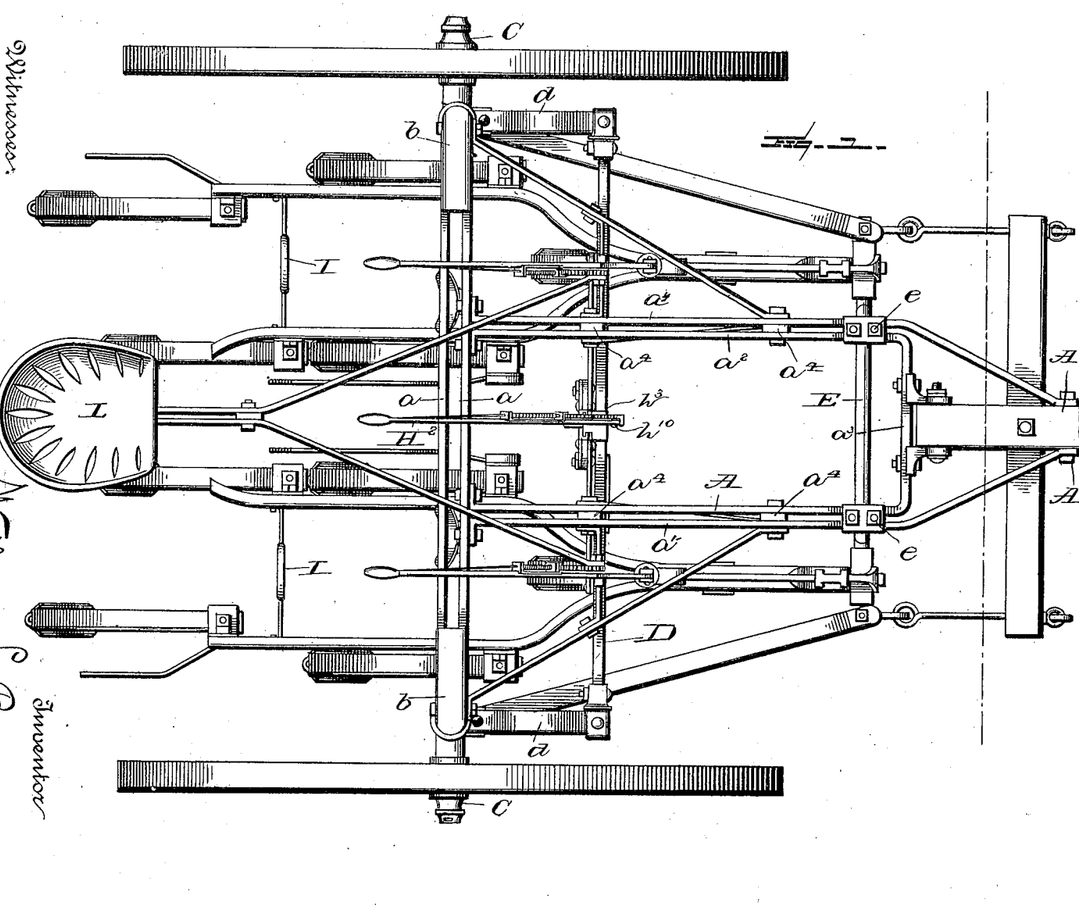
Figure 1 represents a top plan view of a cultivator embodying my invention.

$H^2$ represents a hand-lever pivoted to the casting H at $h^{14}$ and provided with the customary spring-pawl for engaging the segment $k^3$. The lever $H^2$ is connected by a link $H^3$ with a pin $h^{15}$ on the slide H', so that the slide can be moved and held in any desired position by means of the lever and segment. When it is desired to use the machine as an ordinary wheel-cultivator and to steer the sections by means of the operator's feet, the links $h^9 h^9$ can be disconnected from the rods or bars $h$ and by removing the bolt $h^2$ the casting H can be entirely removed from the machine, with all its connected parts. Each section is provided adjacent to its rear end with a loop or stirrup I (see Figs. 1 and 3) for the reception of the feet of the operator, so that the sections can be steered independently. In using the machine in this way it will be necessary to lock the axles, so that they shall hold the wheels in position to travel in a straight line, and in order to effect this result I provide the transverse connecting-bar D with a locking bar or link D', provided with a locking-notch $D^2$, adapted to fit over a member of the frame of the machine, thereby locking the bar D and preventing any movement of the axles with respect to the frame.

I also provide means for adjusting the tongue with respect to the main frame of the machine, which is illustrated in detail in Fig. 4.

K K represent two castings which are bolted to the forward transverse bars $a^3$ of the main frame on either side of the rear end of the tongue A. Each of these castings is provided with a footpiece $k$ to engage the bar $a^3$, said footpiece having upper and lower flanges $k'$ to embrace said bar and being provided with a hole $k^2$, preferably square, to allow the securing-bolts to pass through. Each of the said castings K is provided also with a vertically-disposed guide-plate $k^3$, having an inner smooth face to engage the tongue and an exterior serrated face $k^4$, the said plate $k^3$ being also provided with a vertically-disposed slot $k^5$, curved in the arc of a circle, the center of which is represented by the pivotal connection of the tongue with the main frame at $a'$. A bolt K' passes through the tongue A and through the slots of the plates $k^3 k^3$ and is provided on the outer side of both plates with a clamping-block $k^6$, having a serrated inner face to interlock with the serrations of the outer face of the adjacent plates $k^3$. The bolt is also provided with a nut $k^7$. It will be seen that by loosening the nut $k^7$ sufficiently to allow the clamping-plate $k^6$ to become disengaged from the serrations of the plates $k^3$ the rear end of the tongue can be adjusted up or down to bring the main frame of the machine in the desired position, and the parts can be rigidly secured to the other by turning up said nut $k^7$, all without removing the bolt K'.

The main frame is provided with a rearwardly-extending driver's seat L and with the usual draft appliances, the specific construction of which forms no part of my present invention and need not therefore be described in detail.

It will be observed that in my improved cultivator the elevating and depressing lever G is not attached directly to the cultivator-section controlled by it, but is attached to the sleeve $e^3$ forward of the vertical pivot on which the section swings laterally. Therefore each cultivator-section when adjusted vertically can be swung laterally in either direction without being raised or lowered. I believe this to be an entirely new feature in pivot-axle cultivators, and I claim it broadly.

What I claim, and desire to secure by Letters Patent, is—

1. In a wheel-cultivator, the combination with the main frame, of pivoted axles connected therewith and carrying the supporting-wheels, a connecting-bar connecting said axles for joint movement, the steering-levers for said axles adapted to be operated by the feet of the operator, cultivator-sections pivoted for independent lateral movement, a stirrup on each section adapted to be engaged by the foot of the operator, adjusting mechanism operatively connected with said sections for adjusting them toward or from each other, means for locking the axles rigidly with respect to the main frame and means for disconnecting said adjusting mechanism from the cultivator-sections to enable them to be steered by the operator's feet, substantially as described.

2. In a wheel-cultivator, the combination with the main frame, of pivoted axles connected therewith and carrying the supporting-wheels, a connecting-bar connecting said axles for joint movement, the steering-levers for said axles adapted to be operated by the feet of the operator, independent cultivator-sections adapted to move laterally, a stirrup on each section adapted to be engaged by the foot of the operator, adjusting mechanism detachably secured to said connecting-bar and operatively connected with the cultivator-sections for moving them closer together or farther apart, means for locking the axles with respect to the main frame whereby said adjusting mechanism can be disconnected from the cultivator-sections and removed from the connecting-bar to allow the cultivator-sections to be steered by the feet of the operator, substantially as described.

3. In a cultivator, the combination with the main frame, the pivoted axles carrying the supporting-wheels, steering-levers for said axles and a connecting-bar for securing the joint movement of said axles, two independent laterally-movable cultivator-sections, an adjusting mechanism carried by said connecting-bar and comprising vertical rods pivoted to said connecting-bar and having an engagement with the cultivator-sections, a vertically-movable slide carried by said connecting-bar, links connecting said slide and said vertical rod, means for locking said slide and said links in rigid relation, a hand-lever operatively connected with said slide and means for locking said lever in its adjusted position, substantially as described.

4. In a pivot-axle cultivator the combination with the main frame provided with a horizontal pivot, of a part pivotally connected to said pivot, a cultivator-section pivoted to said part by a vertical pivot to permit the lateral movement of said section, mechanism for adjusting the said cultivator-section laterally and mechanism connected to said pivoted part for adjusting the cultivator-section vertically, whereby the lateral movement of the cultivator-section will not affect its vertical adjustment, substantially as described.

5. In a pivot-axle cultivator, the combination with the main frame provided with a horizontal pivot, of a sleeve mounted on said pivot, a cultivator-section pivoted to said sleeve by a vertical pivot to permit the lateral movement of said section, mechanism for adjusting said section laterally, an elevating-lever secured to said sleeve and mechanism secured to the main frame and operatively connected with said lever whereby the said section may be adjusted vertically and the lateral movement of said section will not affect its vertical adjustment, substantially as described.

6. In a pivot-axle cultivator, the combination with the main frame provided with horizontal pivots, of pivoted axles connected with the main frame and carrying the supporting-wheels, a connecting-bar connecting said axles for joint movement, steering-levers for said axles adapted to be operated by the feet of the operator, a sleeve on each of the said horizontal pivots of the main frame, an independent cultivator-section pivoted to each of said sleeves by a vertical pivot and adjusting mechanism operatively connected with said sections for adjusting them toward or from each other, an independent adjusting mechanism operatively connected to each of said sleeves for adjusting the cultivator-sections vertically, whereby the lateral movement of said cultivator-sections will not affect their vertical adjustment, substantially as described.

7. In a pivot-axle cultivator, the combination with the main frame provided with horizontal pivots, of pivoted axles connected with the main frame and carrying the supporting-wheels, a connecting-bar connecting said axles for joint movement, steering-levers for said axles adapted to be operated by the feet of the operator, a sleeve on each of said horizontal pivots of the main frame, an independent cultivator-section pivoted to each of said sleeves by a vertical pivot and adjusting mechanism operatively connected with said sections for adjusting them toward or from each other, an elevating and depressing lever operatively connected to each of said sleeves, a hand-lever for each of said elevating and depressing levers, secured to the main frame and connections between each of said hand-levers and its respective elevating and depressing lever, substantially as described.

8. In a pivot-axle cultivator, the combination with the main frame provided with horizontal pivots, of pivoted axles connected with the main frame and carrying the supporting-wheels, a connecting-bar connecting said axles for joint movement, steering-levers for said axles adapted to be operated by the feet of the operator, a sleeve on each of the said horizontal pivots of the main frame, an independent cultivator-section pivoted to each of said sleeves by a vertical pivot and adjusting mechanism operatively connected with said sections for adjusting them toward or from each other, an elevating and depressing lever operatively connected to each of said sleeves, a hand-lever for each of said elevating and depressing levers, secured to the main frame, an elevating and depressing rod secured to each of said levers and having a sliding engagement with its respective elevating and depressing lever and a spring interposed between each of said rods and the upper sides of its elevating and depressing lever, substantially as described.

9. In a cultivator, the combination with the main frame, of a cultivator-section pivotally connected to the main frame at its forward end by a connection permitting the vertical movement of said section, an elevating and depressing lever operatively connected with said section, a hand-lever connected to said main frame, an elevating and depressing rod connected to said hand-lever and operatively connected to said elevating and depressing lever for elevating the same and a spring interposed between said rod and the elevating and depressing lever and engaging the upper side of said lever, substantially as described.

10. In a cultivator, the combination with the main frame, of a cultivator-section having a pivotal connection with the main frame to permit the vertical movement of the cultivator-section, an elevating and depressing lever operatively connected with said section and provided at its rear end with a sleeve, a lever pivotally connected to the main frame, an elevating and depressing rod connected to said lever and having its lower end engaging said sleeve on the elevating and depressing lever, said rod being provided with a projection below said sleeve to permit the lifting of the elevating and depressing lever and a spring having one end engaging the upper side of the elevating and depressing lever and the other end engaging a part connected with said rod, substantially as described.

11. In a cultivator, the combination with the main frame, provided with a horizontal pivot, a sleeve mounted on said pivot and provided with a vertical hinge-piece, a cultivator-section pivoted to said hinge-piece by a vertical pivot, an elevating and depressing lever operatively connected with said sleeve to raise and lower the cultivator-section without interfering with its lateral movement, an operating-lever pivoted to the main frame above said elevating and depressing lever, a rod connected to said operating-lever and connected to said elevating and depressing lever by a connection permitting said rod to move downwardly with respect to said lever and a spring interposed between the said rod and said elevating and depressing lever and adapted to exert a downward pressure upon said lever, substantially as described.

12. In a cultivator, the combination with the main frame, provided with pivoted wheel-supporting axles, of a steering-lever for each of said axles and a footpiece provided with a sleeve engaging said lever and means for securing said sleeve to said lever, whereby said footpiece can be adjusted longitudinally or around said lever, substantially as described.

13. In a cultivator, the combination with the main frame provided at each side thereof with a vertical pivot or standard, of a pivot-casting at each side of the machine having a socket to engage one of said standards, and a sleeve to engage an axle, an axle engaging said sleeve, means for adjustably securing said axle in said sleeve and a steering-lever adjustably secured to said casting, substantially as described.

14. In a cultivator, the combination with the main frame of the tongue pivotally connected thereto, a pair of guide-plates secured to the frame at a distance from said pivot and provided with slots concentric with said pivot, clamping-plates for engaging the outer faces of said guide-plates and a clamping-bolt extending through said clamping-plates, guide-plates and tongue and engaging the slots of said guide-plates, substantially as described.

15. In a cultivator, the combination with the main frame of the tongue pivotally connected thereto, a pair of guide-plates secured to the frame at a distance from said pivot and provided with slots concentric with said pivot, said guide-plates having their outer faces serrated, clamping-plates provided with serrated inner faces to engage the outer serrated faces of the guide-plates and a clamping-bolt extending through said clamping-plates, guide-plates and tongue and engaging the slots in said guide-plates, substantially as described.

In testimony whereof I affix my signature in the presence of two witnesses.

WILLIAM L. BEALL.

Witnesses:
G. W. BORTLES,
M. L. DEAN.